United States Patent [19]
Cho et al.

[11] Patent Number: 5,922,066
[45] Date of Patent: Jul. 13, 1999

[54] MULTIFUNCTION DATA ALIGNER IN WIDE DATA WIDTH PROCESSOR

[75] Inventors: Seongrai Cho; Heonchul Park, both of Cupertino; Seungyoon Peter Song, Los Altos, all of Calif.

[73] Assignee: Samsung Electronics Co., Ltd., Seoul, Rep. of Korea

[21] Appl. No.: 08/805,392

[22] Filed: Feb. 24, 1997

[51] Int. Cl.[6] .................................................... G06F 5/01
[52] U.S. Cl. ............................................................ 712/204
[58] Field of Search .................................. 395/562, 380, 395/850; 712/204

[56] References Cited

U.S. PATENT DOCUMENTS

| | | | |
|---|---|---|---|
| 4,785,393 | 11/1988 | Chu | 395/562 |
| 5,471,593 | 11/1995 | Branigin | 395/375 |
| 5,598,546 | 1/1997 | Blomgren | 395/385 |
| 5,787,302 | 7/1998 | Hampapuram | 395/800.24 |

*Primary Examiner*—Eric Coleman
*Attorney, Agent, or Firm*—Skjerven, Morrill, MacPherson, Franklin & Friel LLP; Alan H. MacPherson; David T. Millers

[57] ABSTRACT

A wide data width processor has an execution unit including an aligner that aligns data for load/store instructions and shifts or rotates data for arithmetic logic instructions. Use of the same circuitry and execution unit for these different types of instructions reduces overall circuit size because alignment circuitry need not be repeated, once in a load/store unit and once in an arithmetic logic unit.

15 Claims, 8 Drawing Sheets

MULTIFUNCTION DATA ALIGNER IN WIDE DATA WIDTH PROCESSOR

BACKGROUND

1. Field of the Invention

This invention relates to digital processors and to circuits that manipulate data for of a shift instruction or align data for a load/store instruction.

2. Description of Related Art

Processors typically have specialized circuit units that preform specific operations required for execution of different types of instructions. For example, a typical processor includes a load/store unit that accesses memory as required by load/store instructions and an arithmetic logic unit (ALU) that performs arithmetic operations as required by instructions that add, subtract, multiply, divide, shift, or perform Boolean operations on source operands. The various circuit units in a processor typically contain circuitry that is adapted to the particular functions of the unit and is not usable by other circuit units.

Data alignment is a desirable function in a load/store unit of a wide data width processor such as a SIMD (single instruction multiple data) processor. Without data alignment, an instruction accessing a memory system may be limited to aligned addresses which are integer multiples of the data width. This could complicate programming. Data alignment is, however, an expensive function to implement in an SIMD processor since alignment hardware often includes a network of multiplexers capable of moving a byte from any position within the data width to any other position within the data width. For instance, data alignment hardware for a 32-byte data width might include 32 32-to-1 multiplexers each having 1-byte data ports. Such alignment hardware occupies considerable integrated circuit area and increases the cost of a SIMD processor integrated circuit.

SUMMARY

In accordance with the invention, a processor includes an aligner that is adapted to align data as required for a load/store instruction and to shift data elements within an operand as required for a shift instruction. Accordingly, the aligner is used for load/store instructions and shift instructions. The use of the aligner for multiple functions reduces the total circuit area and the cost of the processor because two separate aligners, one in a load/store unit and one in an ALU, are not required. The aligner is particularly suited for an SIMD processor that processes data vectors having multiple data elements, where each data element is one or more bytes of data. A shift operation that changes the positions of data elements in a data vector performs the type data manipulation required to align a data to a base address that is an even multiple of the number of bytes in a data vector.

One embodiment of the invention, is a processor that includes: a register file; a memory system interface; and an aligner. The aligner includes an input select circuit coupled to receive one or two data value from the register file and load data values from a memory system via the memory system interface. Having multiple inputs connected to the register file allows the aligner to execute shift and rotate operations on data from the register file and align load and store data. In accordance with another aspect of the invention, the input select circuit selects two data values, and the aligner includes an element select circuit coupled to select data elements from the two values to construct an intermediate value that a rotation circuit rotates. The data elements selected depend on the instruction being executed, and such selection allows the rotation circuit to implement data alignment and left and right shifts and rotations.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, an aligner in a wide data width processor such as a SIMD (single instruction multiple data) processor performs data alignment required for execution of load/store instructions and data element movement operations required for execution of shift instructions. Use of the same aligner for both memory access instructions and arithmetic logic instructions reduces the overall circuit area required to fabricate the processor as an integrated circuit and therefore reduces fabrication costs.

Figure 1:
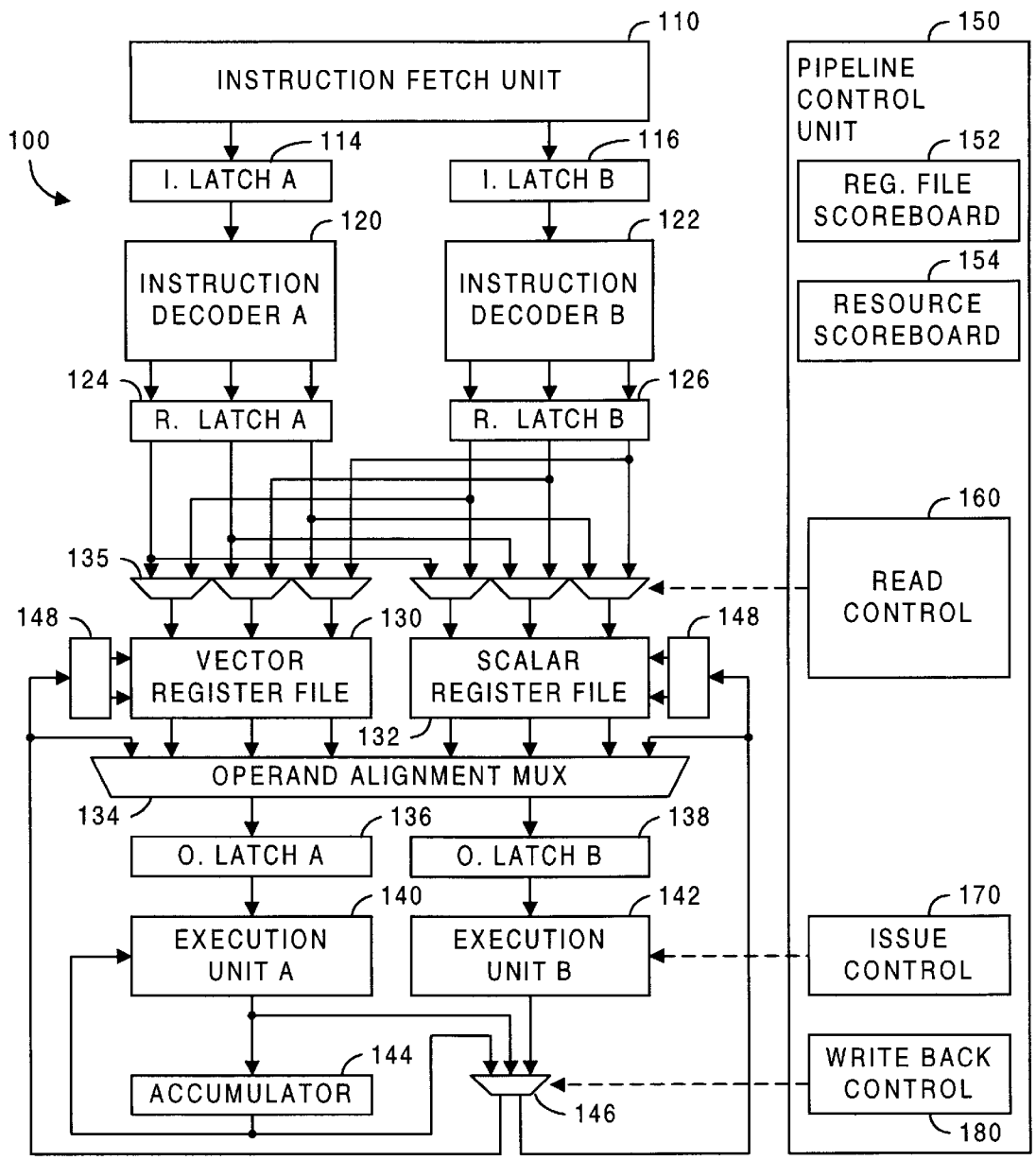
FIG. 1 is a block diagram of a processor in accordance with an embodiment of the invention.

FIG. 1 illustrates an SIMD processor 100 in accordance with an embodiment of the invention. An exemplary embodiment of processor 100 is further described in co-filed U.S. patent application Ser. No. 08/805,389, now U.S. Pat. No. 5,881,307 entitled "DEFERRED STORE DATA READ WITH SIMPLE ANTI-DEPENDENCY PIPELINE INTERLOCK CONTROL IN SUPERSCALAR PROCESSOR," which is incorporated by reference herein its entirety. An instruction set suitable for the exemplary embodiment of the invention is described in U.S. patent application Ser. No. 08/699,597, filed Aug. 19, 1996, entitled "SINGLE-INSTRUCTION-MULTIPLE-DATA PROCESSING IN A MULTIMEDIA SIGNAL PROCESSOR" which is also incorporated by reference in its entirety. U.S. patent application Ser. No. 08/699,597 further describes the an alternative processor architecture in which aspects of the invention may be employed.

SIMD processor 100 is a superscalar processor and includes an instruction fetch unit (IFU) 110, dual instruction decoders 120 and 122, a vector register file 130, a scalar register file 132, and dual execution units 140 and 142 which are capable of operating in parallel. Instruction decoder 120 decodes instructions that execution unit 140 executes, for example, arithmetic logic instructions that add, subtract, multiply, or divide source operands. Instruction decoder 122 decodes load/store instructions, data element shift instructions which execution unit 142 executes and branch instructions that require data or condition codes returned to IFU 110. As used herein, load/store instruction refers to a load, a store, or another instruction that accesses processor memory, and shift instruction refers to an instruction requiring an arithmetic or logical, left or right shift, rotate, or change of data element positions within an operand.

Each clock cycle, IFU 110 fetches up to two instructions, one instruction for each of decoders 120 and 122. IFU 110 loads two instructions, one in a latch 114 and one in a latch 116, for possible parallel decoding and execution if decoder 120 can decode the next instruction in the program order and decoder 122 can decode a second instruction that immediately follows the next instruction in the program order. Otherwise, IFU 110 loads only one instruction, the next instruction in the program order, in latches 114 or 116, for decoder 120 or decoder 122.

During a decode stage, decoders 120 and 122 determine register numbers of source operands required by the fetched instructions. In the exemplary embodiment, each instruction has at most three source operands. A latch 124 holds the register numbers of the source operands of the instruction decoded by decoder 120. A latch 126 holds the register numbers of the source operands of the instruction decoded by decoder 122. Each of vector register file 130 and scalar register file 132 has three read ports so that a up to six source operands can be read per cycle.

A pipeline control unit 150 contains a read control circuit 160 that through multiplexers 135 selects which of the register numbers from latches 124 and 126 and/or a register number for store data for a previously issued store instruction are routed to read ports of register files 130 and 132. In the selection process, read control 160 checks a register file score board 152 to determine whether any of the source operands will be written by issued instructions. If a source operand depends on an issued instruction, the source operand has read-after-write (RAW) dependency on a pending instruction, and the value in register file 130 or 132 is not yet valid. Read control 160 does not select such source operands for reading from register files 130 and 132 during the next clock cycle, but the operands may be forwarded from execution unit 140 or 142. Other source operands for an instruction having (RAW) dependency may be selected and read from register files 130 and 132. If, after eliminating reads for the source operands having RAW dependency, the instructions require reading more than three vector operands or more than three scalar operands, read control circuit 160 selects only the register numbers for one instruction, the next instruction in the program order, or stalls decoders 120 and 122 if the next instruction requires three source operands of the same type, scalar or vector, and a read of store data of the same type is required for a previously issued store instruction.

Co-filed U.S. patent application Ser. No. 08/811,188, now U.S. Pat. No. 5,799,163 entitled "RESERVATION STATION DESIGN IN VECTOR ARCHITECTURE TO REDUCE REGISTER READ PORTS", further describes circuits and processes for operand forwarding for the exemplary embodiment of the invention and is incorporated by reference herein in its entirety. Co-filed U.S. patent application Ser. No. 08/805,389, further describes handling store instructions and reads of store data.

During the read stage, multiplexers 135 select the register numbers for registers in register files 130 and 132 that will be read. In the exemplary embodiment, vector register file 130 contains 64 32-byte (or 256-bit) vector registers that are organized into two banks of 32 vector registers. The vector registers store data vectors, each containing multiple data elements. For example, a 32-byte data vector may contain 32 8-bit data elements, 16 16-bit data elements, or 8 32-bit data elements. Scalar register file 132 contains 32 32-bit scalar registers, and each scalar register holds a single 8-bit, 16-bit, or 32-bit value. An operand alignment multiplexer 134 directs the data read from register files 130 and 132 and results forwarded from execution units 140 and 142 to operand latches 136 and 138 that respectively hold operands for execution units 140 and 142.

An issue control circuit 170 in pipeline control unit 150 determines if necessary source operands in latches 136 and 138 are valid and checks resource scoreboard 154 to determine whether the required resources are available for issue of an instruction to an execution stage. Issuing an instruction starts execution unit 140 or 142 processing the source operands from operand latch 136 or 138. In the exemplary embodiment, execution unit 140 has a 32-byte data path and depending on the data type for data elements, performs 32, 16, or 8 parallel arithmetic operations. Execution unit 140 completes integer arithmetic operations in one or two clock cycles and completes floating point operations in three clock cycles. Execution unit 142 performs load, store, and data element move operations that are described below.

A write back control circuit 180 controls the routing of the results from execution units 140 and 142 and output from an accumulator 144. The results from execution units 140 and 142 can be stored in accumulator 144 or routed through a write back multiplexer 146 to a latch 148 for writing to register file 130 or 132 during a write stage and to operand alignment multiplexer 134 for operand forwarding for instructions to be issued.

Figure 2:
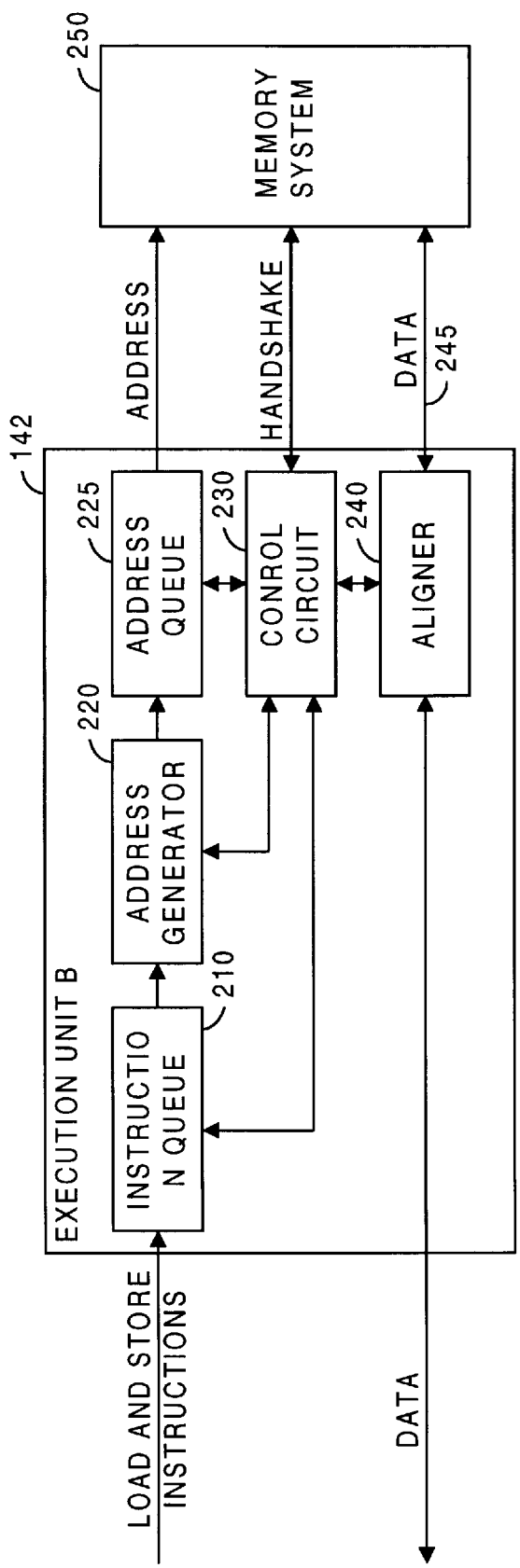
FIG. 2 is a block diagram of an execution unit for store/load and data element shift instructions.

FIG. 2 shows an embodiment of execution unit 142 connected to a memory system 250. Memory system 250 may include on-chip memory such as level-1 data cache or scratch pad memory that is connected to a main memory through an off-chip level-2 cache system. Execution unit 142 executes load/store instructions that may access data locations in on-chip memory, a level-2 cache, or main memory. Accordingly, the time required to complete a load or store depends on factors such as whether there is a cache miss. In the exemplary embodiment, a memory access takes a minimum of three clock cycles to access an on-chip scratch pad memory.

To reduce pipeline stalls, execution unit 142 contains an instruction queue 210 that holds up to four load or store instructions from issue control circuit 170. An address generator 220 coupled to instruction queue 210 calculates effective addresses for the instructions. Depending on the addressing mode employed, effective address calculations may require one or two values from scalar register file 132 and/or an immediate value from the instruction. An address queue 225 holds the address values corresponding to the instructions in instruction queue 210, and a control circuit 230 controls internal operation of execution unit 142 and an interface with memory system 250.

To access memory system 250, control circuit 230 checks a buzy signal from memory system 250 to determine if memory system is accepting request. If memory system is not buzy, control circuit 230 asserts a request to memory system, an address signal from address queue 225 and for a store instruction a data signal representing the store data. For a load operation, control circuit 230 waits until memory system 250 grants access to read load data from a data bus 245 to aligner 240. Handshake signals identify which of the instructions in queues 210 and 225 is being granted access so that execution unit 142 can respond accordingly.

The exemplary embodiment of processor 100 uses 32-bit effective addresses EA[31:0], but cache lines in memory system 250 are 32-byte data vectors identified by the 27 most significant address bits EA[31:5]. An unaligned load or store of a data vector occurs when the least significant bits EA[4:0] of the effective address EA[31:0] are not equal to zero. For an unaligned load, execution unit 142 requests two data vectors from memory system 250, a 32-byte data vector from an address EA[31:5] and a 32-byte data vector from an address EA[31:5]+1, and the request data vector is constructed from the two load data vectors. For an unaligned store, aligner rotates the data elements in the store data so that the elements are in their correct positions for storage in two cache lines in memory system 250.

Figure 3:
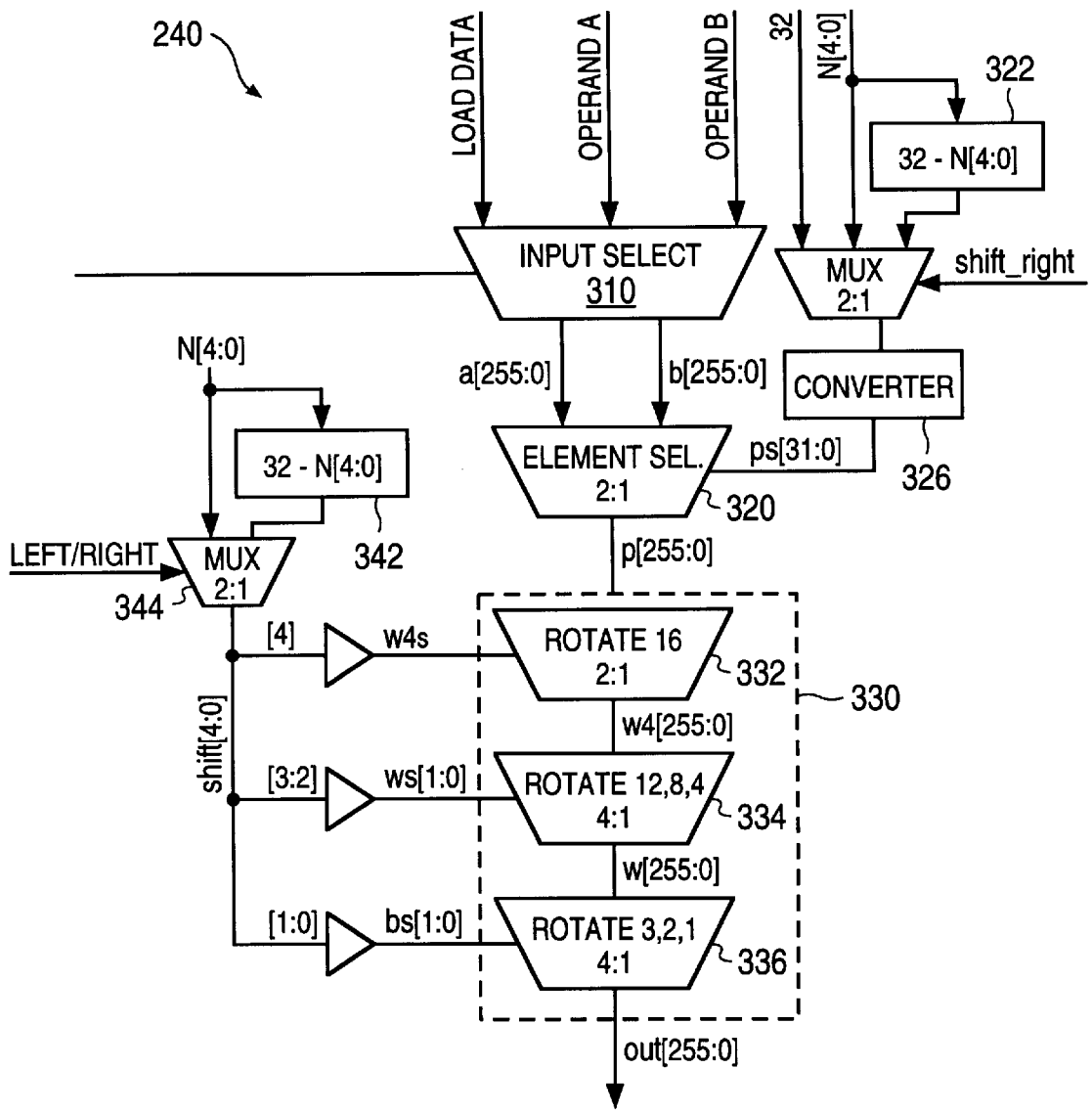
FIG. 3 is a block diagram of an aligner in accordance with an embodiment of the invention.

FIG. 3 shows a block diagram of an embodiment of aligner 240. In this embodiment, aligner 240 includes an input select circuit 310, an element select circuit 320, and a rotation circuit 330. Input select circuit 310 selects an input data vector for aligner 240. For a data element shift or rotate operations, input select circuit 310 selects from operand latch 138 a vector operand A and an operand B (vector or scalar) that supplies one or more data elements that are shifted into a resultant vector when operand A is shifted. For an unaligned store operation, input select circuit 310 selects store data from latch 138. For a load operation, input select circuit 310 selects data vectors from the attached memory system 250.

Figure 6:
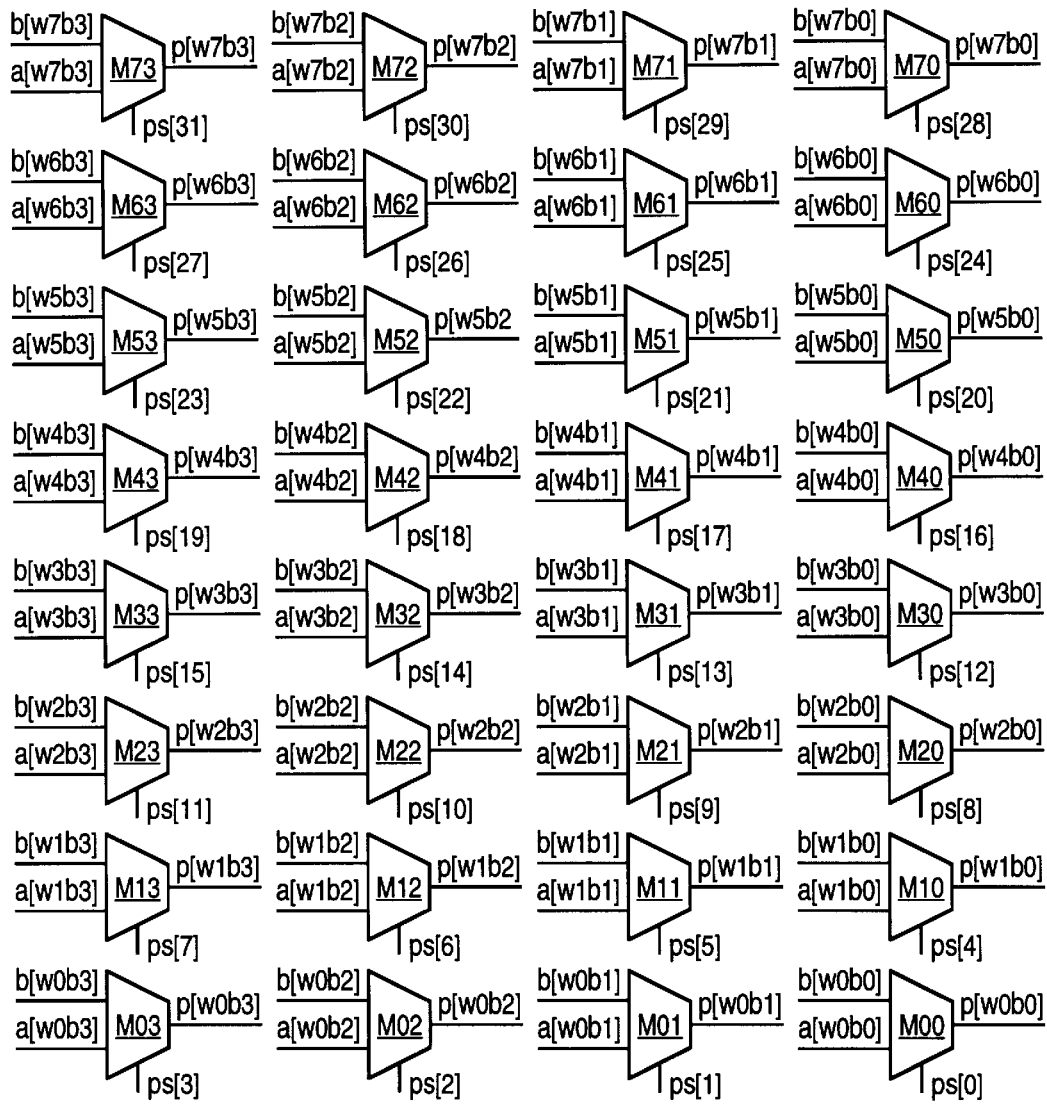
FIGS. 6, 7, 8, and 9 show internal elements of circuit block in the aligner of FIG. 3.

Input signals to element select circuit 320 include signals a[255:0] and b[255:0] from input select circuit 310. As shown in FIG. 6, element select circuit 320 includes 32 multiplexers Mij, for i between 0 and 7 and j between 0 and 3. Each multiplexer Mij has two 8-bit input ports and an 8-bit output port. Each of the 32 multiplexers is associated with a element position indicated by an index w0 and w7 identifying a word in a 32-byte vector and an index between b0 and b3 indicating a byte within the word.

In FIG. 3, a selection signal ps[31:0] for the 32 multiplexers in element select circuit 320 has N least significant bits set to one to select the right-most bytes of signal b[255:0] and 32-N most significant bits set to zero to select the left-most bytes of signal a[255:0]. A converter 326 converts a signal N[4:0] to the string of set bits in signal ps[31:0]. If the 32-N right-most bytes of signal b[255:0] are to be selected, a multiplexer 324 selects a signal representing 32-N from an adder 322. Multiplexer Mij selects whether byte j in word i of an output signal p[255:0] is from signal a[255:0] or from signal b[255:0]. Rotation circuit 330 right rotates the bytes in signal p[255:0] by between 0 and 31 byte positions. A right rotation by (32-N) byte positions is of course equivalent to a left rotation by N byte positions for a 32-byte data width.

Figure 4A:
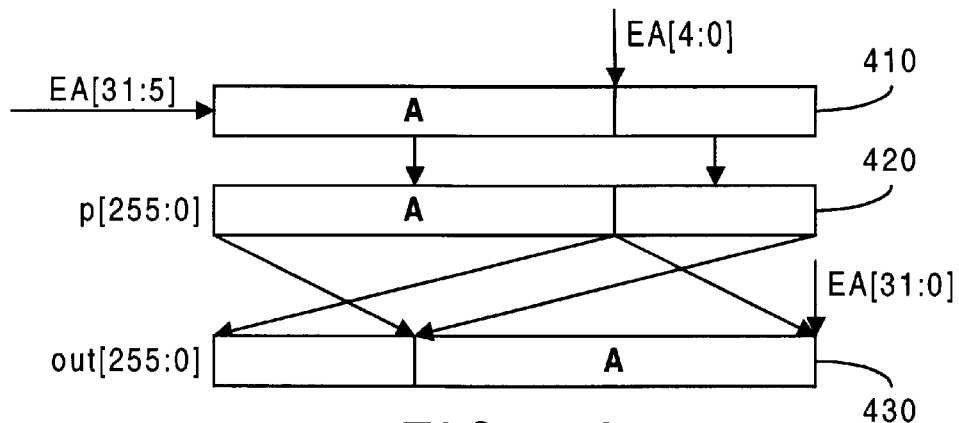
FIGS. 4A, 4B, and 4C illustrate data alignment processes for a load and a store.
Figure 4B:
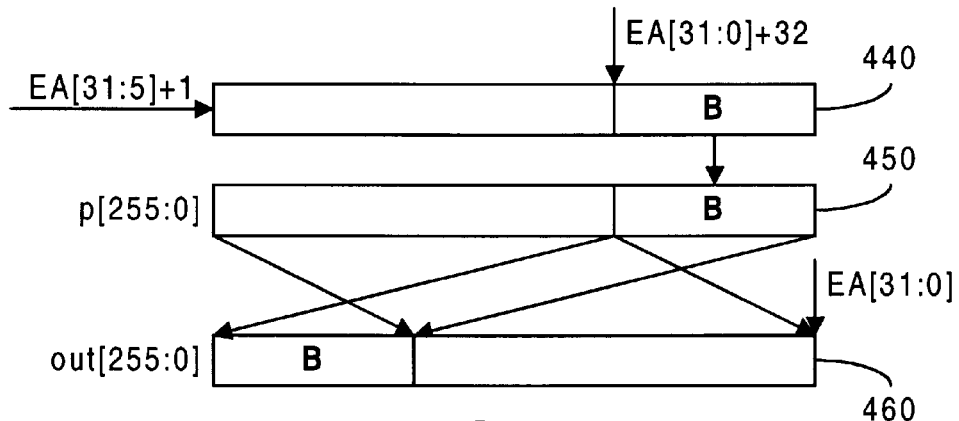

FIGS. 4A and 4B illustrate the operation of aligner 240 for an unaligned load from an effective address EA[31:0] where least significant bits EA[4:0] represent a non-zero integer N. For an unaligned load, execution unit 142 requests a data vector 410 from address EA[31:5] and a data vector 440 from address EA[31:5]+1. When memory system 250 returns the requested data vector 410, input select circuit 310 and element select circuit 320 select data vector 410 as signal p[255:0], and rotation circuit 330 rotates signal p[255:0] right N bytes to generate output signal out[255:0] which represents a resultant data vector 430 having 32-N right-most bytes from effective address EA[31:0]. Vector 430 is written to a destination register in register file 130. When memory system 250 returns the requested data vector 440, input select circuit 310 and element select circuit 320 select data vector 440 as signal p[255:0]. Rotation circuit 330 rotates signal p[255:0] right N bytes to generate output signal out[255:0] which represents a resultant data vector 460 having N left-most bytes from the 32-byte data vector at effective address EA[31:0]. To complete the unaligned load, vector 460 is written to register file 130 with a write mask set so that only the N left-most bytes in the destination register are changed.

Figure 4C:
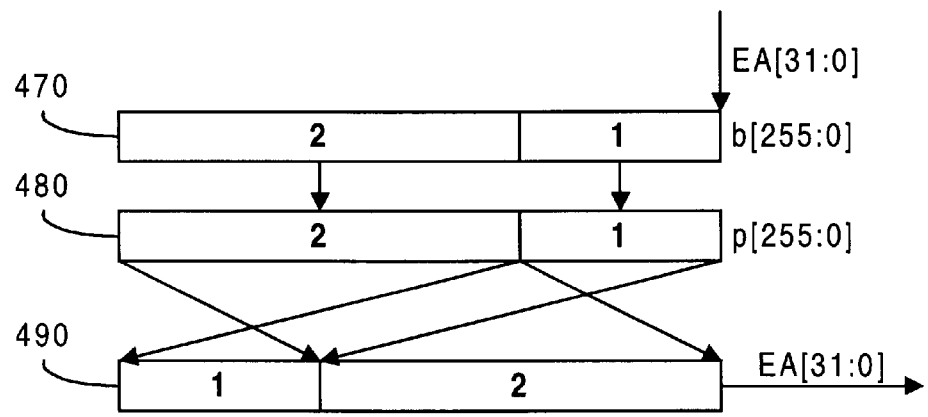

For an unaligned store instruction, memory system 250 writes to two cache lines, and aligner 240 aligns the elements of a store data vector for memory system 250. FIG. 4C illustrate operation of aligner 240 for an unaligned store where the least significant effective address bits EA[4:0] indicate a non-zero value N. For an unaligned store, input select circuit 310 and element select circuit 320 select store data vector 470 from register file 130 as signal b[255:0] and signal p[255:0], respectively. Rotation circuit 330 rotates signal p[255:0] N byte positions to the right to generate output signal out[255:0] which is output to memory system 250. Memory system 250 upon receiving signal out[255:0] and an unaligned address EA[31:0] writes signal out[255:0] to two caches lines. For a line identified by EA[31:5], signal out[255:0] is written using a write mask that selects only the N (N=EA[4:0]) left-most bytes. For a line identified by EA[31:5]+1, signal out[255:0] is written using a write mask that selects only the 32-N right-most bytes.

Figure 5A:
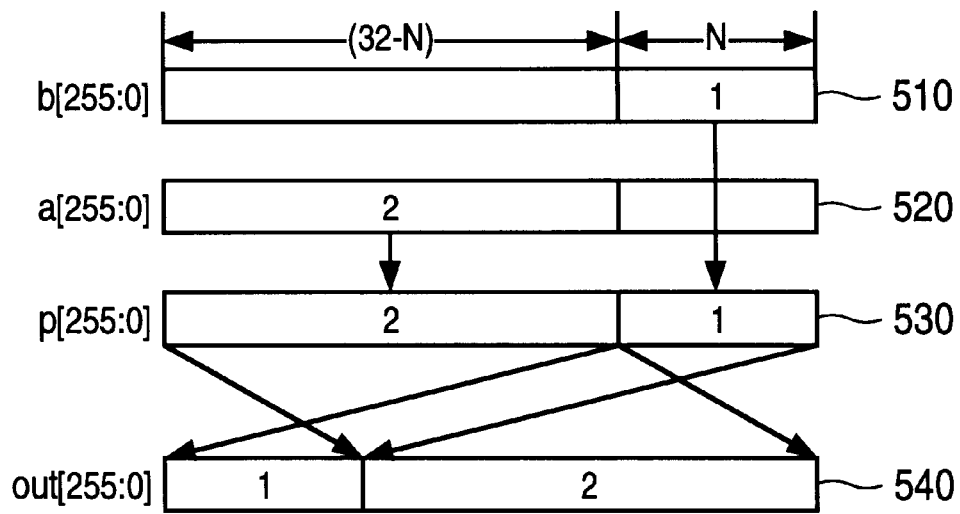
FIGS. 5A and 5B respectively illustrate right and left data element shift operations.

In addition to aligning data as required for unaligned load and store operations, aligner 240 performs data element shift and rotate operations. FIG. 5A illustrates an operation where aligner 240 shifts a data vector 520 N byte positions to the right and a data vector 510 supplies N data elements that are shifted in from the left of data vector 520. Operand latch 138 simultaneously supplies data vectors 510 and 520 which input select circuit 310 respectively selects as signals b[255:0] and a[255:0]. A third scalar source operand may indicate the value N. From vectors 510 and 520, element select circuit 320 selects the N right-most bytes of data vector 510 and the (32-N) left-most bytes of data vector 520 to construct an intermediate data vector 530 represented by signal p[255:0]. Rotation circuit 330 then rotates the byte positions of data vector 530 by moving the N right-most bytes of data vector 530 to the N left-most byte positions in a resultant data vector 540 and moving the (32-N) left-most bytes of data vector 530 to the (32-N) right-most byte positions of a resultant data vector 540 represented by output signal out[255:0]. Vector result 540 can then be written to a destination register in vector register file 130.

The left shift of FIG. 5A can be varied in a number of ways for other shift instructions. For example, a rotate left instruction can use a single vector source operand that element select circuit 320 selects in entirety as intermediate vector 530 before constructing resultant data vector 540. Also, for a shift left by one data element (i.e. 1-byte, 2-bytes, of 4-bytes depending on the data element size), data vector 510 can be replaced by a scalar source operand that provides a data element that element select circuit 320 selects for the right-most byte positions in data vector 530. Additionally, the unselected data element from data vector 520 can provide a scalar result that is written to scalar register file 132 when vector result 540 is written to vector register file 130. For the one data element shift, a source operand is not needed to indicate a shift value N because the shift value N is implied by the data element type.

Further, additional circuitry may be provide in, after, or in parallel with element select circuit 320 to implement other inter-element move instructions which for example shuffle data elements from two source data vectors or unshuffle data elements from a single source data vector to two resultant data vectors.

Figure 5B:
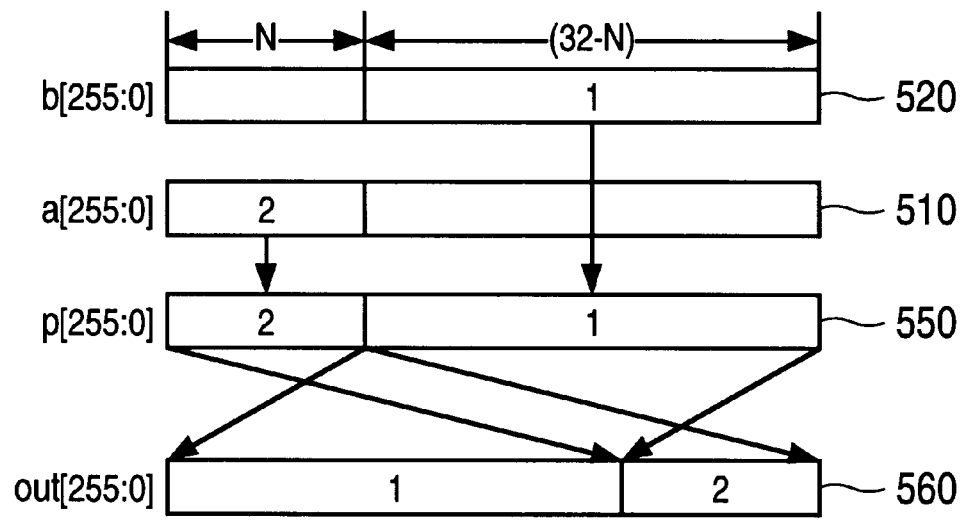

FIG. 5B illustrates shifting data vector 520 left by N byte positions where data vector 510 supplies bytes to be shift into the right of a resultant data vector 560. Input select circuit 310 selects signal a[255:0] and b[255:0] to respectively represent data vectors 510 and 520. For the shift left, element select circuit 320 selects the (32-N) right-most bytes of data vector 520 and the N left-most bytes of data vector 510 which remain in position when forming an intermediate data vector 550 represented by signal p[255:0]. Rotation circuit 330 rotates data vector 550 32-N byte positions to the right by moving the N left-most bytes of data vector 550 to the N right-most byte positions in a resultant data vector 560 and the (32-N) right-most bytes in data vector 550 to the (32-N) left-most byte positions in data vector 560. Resultant data vector 560 can then be written in vector register file 130. The left shift can be varied in a similar manner to the right shift to implement a rotate operation or a shift by one data element.

As illustrated in FIG. 3, the exemplary embodiment of rotation circuit 330 includes three subblocks 332, 334, and 336 which are controlled by a 5-bit signal SHIFT[4:0]. Block 332 rotates a 32-byte data vector represented by signal p[255:0] by 16 or 0 byte positions to the right depending on the value of bit SHIFT[4]. Block 334 rotates a signal w4 [255:0] from block 332 by 12, 8, 4, or 0 byte positions to the right, depending on the value of bits SHIFT [3:2]. Block 336 rotates a signal w[255:0] from block 334 by 3, 2, 1, or 0 byte positions to the right depending on the value of bits SHIFT[1:0]. A multiplexer 344 sets signal SHIFT [4:0] equal to value N for a right shift by N byte positions or to 32-N for a left shift by N byte positions.

Figure 7:
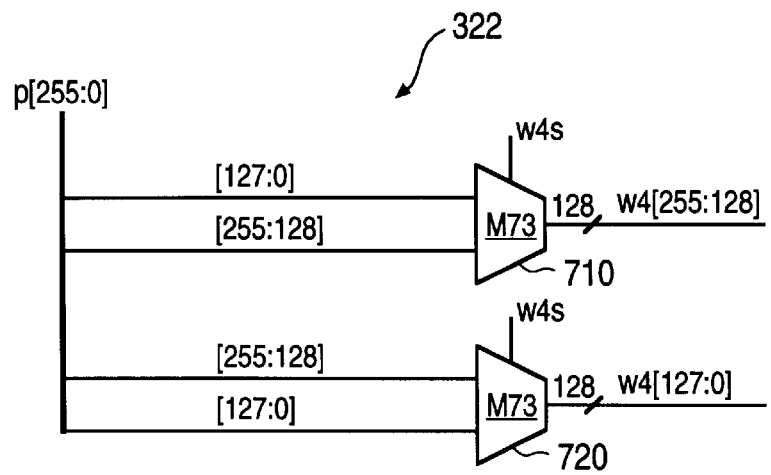
Figure 8:
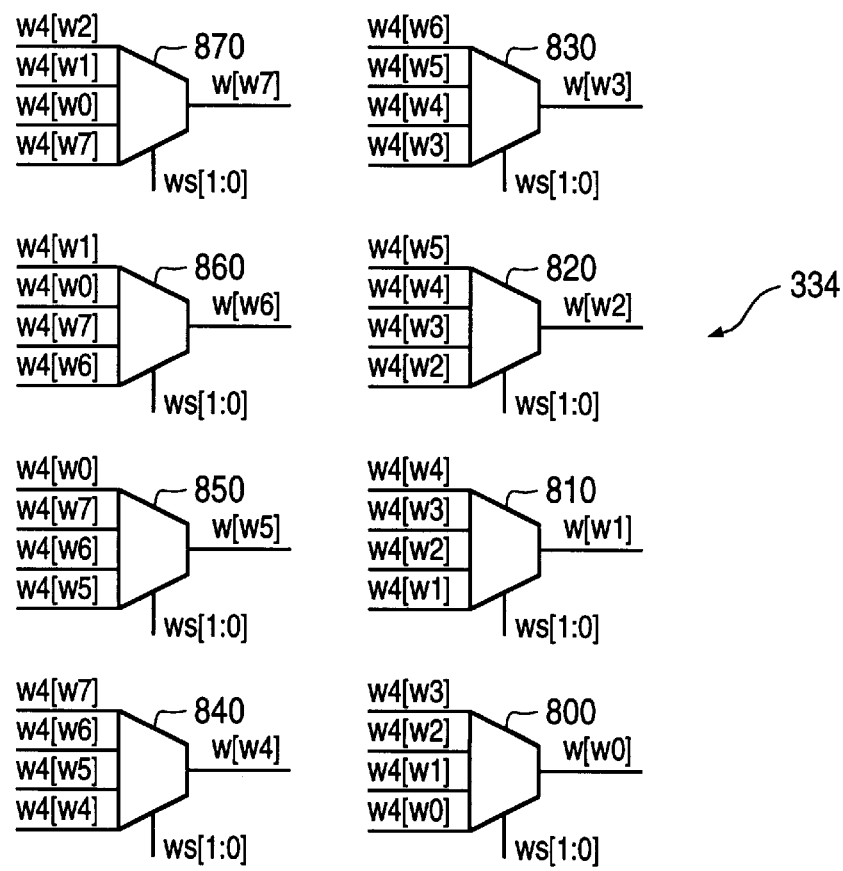
Figure 9:
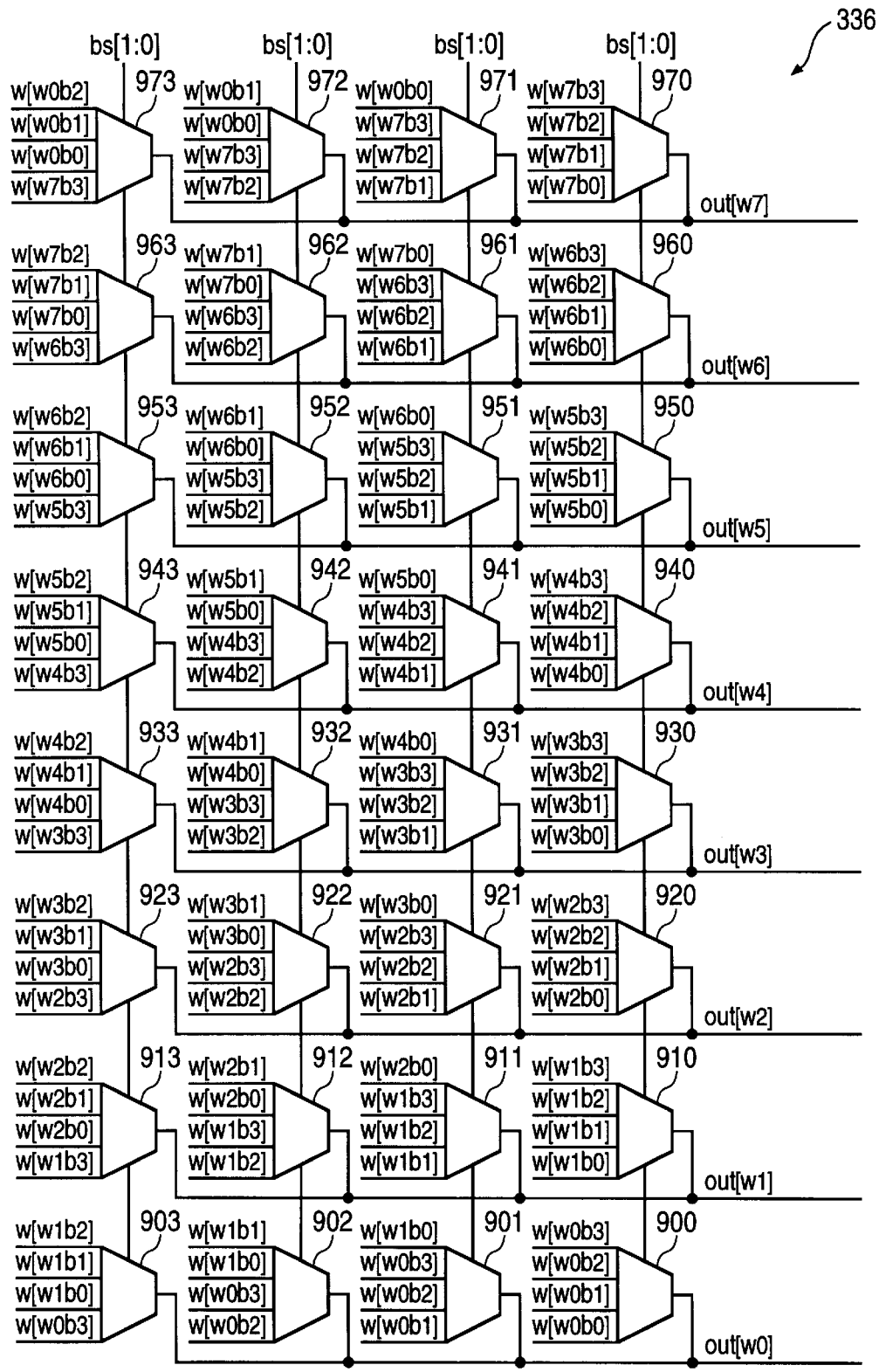

FIGS. 7, 8, and 9 respectively illustrate blocks 332, 334, and 336 of the exemplary embodiment of rotation circuit 330. Block 332 includes two 2:1 multiplexers 710 and 720 having 128-bit input and output ports coupled to swap the right-most 128 bits and the left-most 128 bits if bit SHIFT[4] is set. Block 334 includes eight 4:1 multiplexers 800, 810, 820, 830, 840, 850, 860, and 870 that have 32-bit input and output ports. Multiplexers 800, 810, 820, 830, 840, 850, 860, and 870 have output ports respectively associated with the positions w0 to w7 of 32-bit words in a 32-byte signal w[255:0] and have input ports coupled to 32-bit word positions w0 to w7 of signal w4 [255:0] as required to rotate signal w4 [255:0] right by 12, 8, 4, or 0 bytes (i.e. 3, 2, 1, or 0 word positions). Block 336 includes 32 4:1 multiplexers as shown in FIG. 9 that have 8-bit input and output ports. Each of the multiplexers in FIG. 9 is associated with a byte in 32-byte output signal out[255:0] and has input ports coupled to the bytes in signal w[255:0] that are 0, 1, 2, and 3 byte positions to the left of the associated byte position.

Although the invention has been described with reference to particular embodiments, the description is only an example of the invention's application and should not be taken as a limitation. In particular, even though much of preceding discussion was aimed at a processor having a 32-byte data width, alternative embodiments of this invention include an arbitrary data width W. Further, specific rotation circuitry that performs right shifts could be replaced by circuitry of other types, such as circuitry that rotates data left. Various other adaptations and combinations of features of the embodiments disclosed are within the scope of the invention as defined by the following claims.

We claim:

1. A method for operating a processor, comprising:
   shifting data with an aligner, to align the data for execution of a load/store instruction having an unaligned effective address; and
   shifting data with the aligner, for execution of a shift instruction.

2. The method of claim 1, wherein execution of the shift instruction comprises:
   reading a first source operand from a register file;
   shifting data elements of the first source operand, with the aligner, to generate a resultant operand; and
   storing the resultant operand in the register file.

3. A method for operating a processor, comprising:
   shifting data with an aligner, to align the data for execution of a load/store instruction having an unaligned effective address; and
   shifting data with the aligner, for execution of a shift instruction,
   wherein execution of the shift instruction comprises:
      reading a first source operand from a register file;
      reading a second source operand from the register file, wherein each of the first and second source operands contains W data elements;
      constructing an intermediate value that includes N data elements from the second source operands and (W–N) data elements from the first source operand, where N is a non-zero positive integer;
      shifting data elements of the first source operand, with the aligner, to generate a resultant operand, wherein shifting data elements of the first source operand comprises rotating the data elements of the intermediate value; and
      storing the resultant operand in the register file.

4. A method for operating a processor, comprising:
   shifting data with an aligner, to align the data for execution of a load/store instruction having an unaligned effective address; and
   shifting data with an aligner, for execution of a shift instruction,
   wherein execution of the load/store instruction comprises:
      calculating an effective address for the load/store instruction;
      reading a store operand that supplies the data to be shifted;
      shifting data elements of the store operand, with the aligner, to generate a first value;
      writing the first value to a first address in a memory system;
      shifting data elements of the store operand, with the aligner, to generate a second value; and
      writing the second value to a second address in the memory system.

5. The method of claim 4, wherein the steps of shifting data elements comprise:
   selecting data elements from the store operand;
   constructing an intermediate value that includes the selected data elements from the store operand and data elements from a source other than the store operand; and
   rotating the data elements in the intermediate value.

6. The method of claim 5, wherein the data elements from the source other than the store operand have dummy values.

7. The method of claim 5, wherein the source other than the store operand is a value read from the memory system.

8. The method of claim 4, wherein execution of the shift instruction comprises:
   reading a first source operand from a register file;
   shifting data elements of the first source operand, with the aligner, to generate a resultant operand; and
   storing the resultant operand in the register file.

9. A method for operating a processor, comprising:
   shifting data with an aligner, to align the data for execution of a load/store instruction having an unaligned effective address; and shifting data with the aligner, for execution of a shift instruction, wherein execution of the load/store instruction comprises:

calculating an effective address for the load/store instruction, wherein a difference N between the effective address and a first aligned address is non-zero;

reading a first value of from the first aligned address in a memory system;

reading a second value from a second aligned address in the memory system, wherein a difference W between the second aligned address and the first aligned address is non-zero;

constructing an intermediate value containing (W−N) right-most data elements from the first value and the N left-most data elements from the second value; and rotating data elements of the intermediate value with the aligner, to generate a result.

10. The method of claim 9, wherein execution of the shift instruction comprises:

reading a first source operand from a register file;

shifting data elements of the first source operand, with the aligner, to generate a resultant operand; and storing the resultant operand in the register file.

11. A processor comprising:

a register file;

a memory system interface; and an aligner comprising:

an input select circuit coupled to receive a first data value and a second data value from the register file and a third data value from a memory system via the memory system interface, wherein the input select circuit provides first and second signals representing a fourth value and a fifth value that are selected from a set including the first, second, and third data values;

an element select circuit coupled to input select circuit, wherein the element select circuit generates a third signal representing a sixth value that includes a first set of data elements from the fourth value and a second set of data elements from the fifth value; and a rotation circuit coupled to rotate the data elements of the third signal.

12. The processor of claim 11, wherein:

for execution of a load instruction, the input select circuit selects that the first signal represents the third data value from the memory system; and for execution of a shift instruction, the input select circuit selects that the first signal represents the first data value from the register file.

13. The processor of claim 11, wherein each data element comprises a byte.

14. The processor of claim 11, wherein each of the fourth, fifth, and sixth values comprises W data elements, and the element select circuit comprises a W multiplexers, each multiplexer be associated with a data element position existing in the fourth, fifth, and sixth values.

15. The processor of claim 1, wherein the load/store instruction is a store instruction.

* * * * *